United States Patent
Smith et al.

(10) Patent No.: US 6,697,842 B1
(45) Date of Patent: Feb. 24, 2004

(54) DYNAMIC CONTEXT FILTERS FOR COMMUNICATION AND INFORMATION MANAGEMENT

(75) Inventors: Colin Donald Smith, Ottawa (CA); Brian Finlay Beaton, Orleans (CA)

(73) Assignee: Northern Telecom (CA)

( * ) Notice: Subject to any disclaimer, the term of this patent is extended or adjusted under 35 U.S.C. 154(b) by 0 days.

(21) Appl. No.: 09/167,494

(22) Filed: Oct. 7, 1998

(51) Int. Cl.7 .............................. G06F 11/00
(52) U.S. Cl. .............. 709/206; 709/228; 370/94.1
(58) Field of Search .................... 709/206, 203, 709/218, 219, 228, 233, 250, 238, 239; 370/94.1; 379/10; 455/166.2

(56) References Cited

U.S. PATENT DOCUMENTS

| | | | | |
|---|---|---|---|---|
| 5,257,416 A | * | 10/1993 | Cannon | 455/166.2 |
| 5,570,367 A | * | 10/1996 | Ayanoglu et al. | 370/94.1 |
| 5,764,899 A | * | 6/1998 | Eggleston et al. | 709/203 |
| 5,790,633 A | * | 8/1998 | Kinser et al. | 379/10 |
| 5,828,833 A | * | 10/1998 | Belville et al. | 713/201 |
| 5,848,233 A | * | 12/1998 | Radia et al. | 713/201 |
| 5,913,041 A | * | 6/1999 | Ramanathan et al. | 709/233 |
| 5,958,006 A | * | 9/1999 | Eggleston et al. | 709/219 |
| 6,256,498 B1 | * | 7/2001 | Ludwig | 455/433 |

* cited by examiner

*Primary Examiner*—Hosain Alam
*Assistant Examiner*—Khanh Quang Dinh
(74) *Attorney, Agent, or Firm*—Steubing McGuinness & Manaras LLP

(57) ABSTRACT

A dynamic context filter for communication and information management filters information using dynamic parameters corresponding to a particular user. Dynamic context filters may represent user location, current time, or past preferences. Filtered information may be prioritized based on proximity, time, or past preferences. The importance of dynamic context filter parameters may be weighted.

24 Claims, 9 Drawing Sheets

| Business | Location | Cost ($) | Frequency | Certification | Payment | Miscellaneous |
|---|---|---|---|---|---|---|
| Aadvark | 27 km | 27.00/Day | never | none | cash | |
| Adams | 3 km | 32.00/Day | never | AAA | VISA, MASTER | |
| Advantage | 30 km | 34.00/Day | 1 | AAA | VISA, MASTER | |
| Avis | 12 km | 30.00/Day | 3 | AAA Michelin | VISA, MASTER, AMEX | |
| Bobs | 22 km | 34.00/Day | never | none | VISA | |
| Budget | 5 km | 35.00/Day | 6 | AAA Michelin | VISA, MASTER | |
| Car City | 1.5 km | 32.00/Day | never | none | MASTER | |
| Capitol | 3.5 km | 32.00/Day | never | Micheline | VISA, MASTER | |
| Tilden | 14 km | 37.50/Day | 4 | AA Michelin | VISA, MASTER, AMEX | |

FIG. 11

DYNAMIC CONTEXT FILTERS FOR COMMUNICATION AND INFORMATION MANAGEMENT

BACKGROUND ART

In light of the rapid technological developments and globalization of the world economy, the role of telecommunication is becoming increasingly important. As such, there is a growing focus on using state of the art computer technology to provide new and improved telecommunication capabilities. The capability of combining voice and digital data transmission is enabled by the GSM (Global System for Mobile Communications) protocol.

In addition, public networks, such as the World Wide Web allow users to access information on a wide array of topics and for a variety of purposes, ranging from playing games to researching the latest medical discovery. The ever increasing amount of information available on the web, however, has made accessing desired information more difficult. Despite the availability of sophisticated search engines, searches on the web remain highly random and often require a great deal of the users' time and effort to sift through.

As a consequence of the increasing popularity and high level of network traffic, users often experience unacceptably slow response times to information requests. Extended idle periods, generally during loading of a new web page, can be very distracting for users and they may quickly lose interest, sometimes aborting a particular request for a web page.

To alleviate these problems, research and development has been devoted to making the web more efficient and easier to use. For example, some web service automatically collects and delivers information from web sites to the user as screen savers. The information, however, is collected only from user-specified web sites. Thus, the breadth of information delivered to the user depends significantly on the user's current knowledge of the available resources. As such, this service does not alleviate the problem of the users receiving only a part of the benefit that the web can provide.

Other types of "push technology," which gather information relevant to a particular user based on predefined user profile and "push" the information to the user, are also available. While push technology eliminates the need for users to actively seek information, web-based services deliver a vast amount of low-value information.

Problems of information overload and irrelevant content are further exacerbated in mobile communication settings. In these settings, for example, display of much low-value information on a small display severely compounds the problem of overwhelming the user. Additionally, the user may be unwilling to spend time laboriously sifting through a large quantity of information while paying for cellular connection time.

Compounding the problems of the current push technology is the static nature of the push technology that does not adapt to the dynamic nature of mobile communications. It may be desirable, for example, for the user to obtain information on a certain geographical location based on the current location of a user's mobile phone, which rarely remains static. Additionally, other dynamic factors may be helpful in better tailoring information targeted to a particular user.

Therefore, it is desirable to filter and deliver high-value content to the user effectively.

It is also desirable to provide content tailored to dynamic parameters of the user.

SUMMARY OF THE INVENTION

Accordingly, the present invention is directed to dynamically filtering information that substantially obviates one or more of the problems due to limitations and disadvantages of the related art.

Specifically, a method consistent with the present invention for dynamically filtering information contains several steps. Initially, the present invention stores parameters of a dynamic context filter in the server. It also receives from a communication device a request for information from the network, and determines the location of the communication device. Finally, the present invention filters the information from the network using the dynamic context filter.

A system consistent with the present invention for dynamically filtering information contains a memory, receiving means, determining means, and filtering means. The memory stores parameters of a dynamic context filter in the server, and the receiving means receives from a communication device a request for information from the network. Determining means determines the location of the communication device. Finally, filtering means filters the information from the network using the dynamic context filter.

BRIEF DESCRIPTION OF THE DRAWINGS

The accompanying drawings, which are incorporated in and constitute a part of this specification, illustrate the invention and together with the description, serve to explain the principles of the invention.

In the drawings,

FIG. 11 is a table illustrating an exemplary format and content of the user profile portion of a dynamic context filter.

DESCRIPTION OF THE PREFERRED EMBODIMENT

Figure 1:
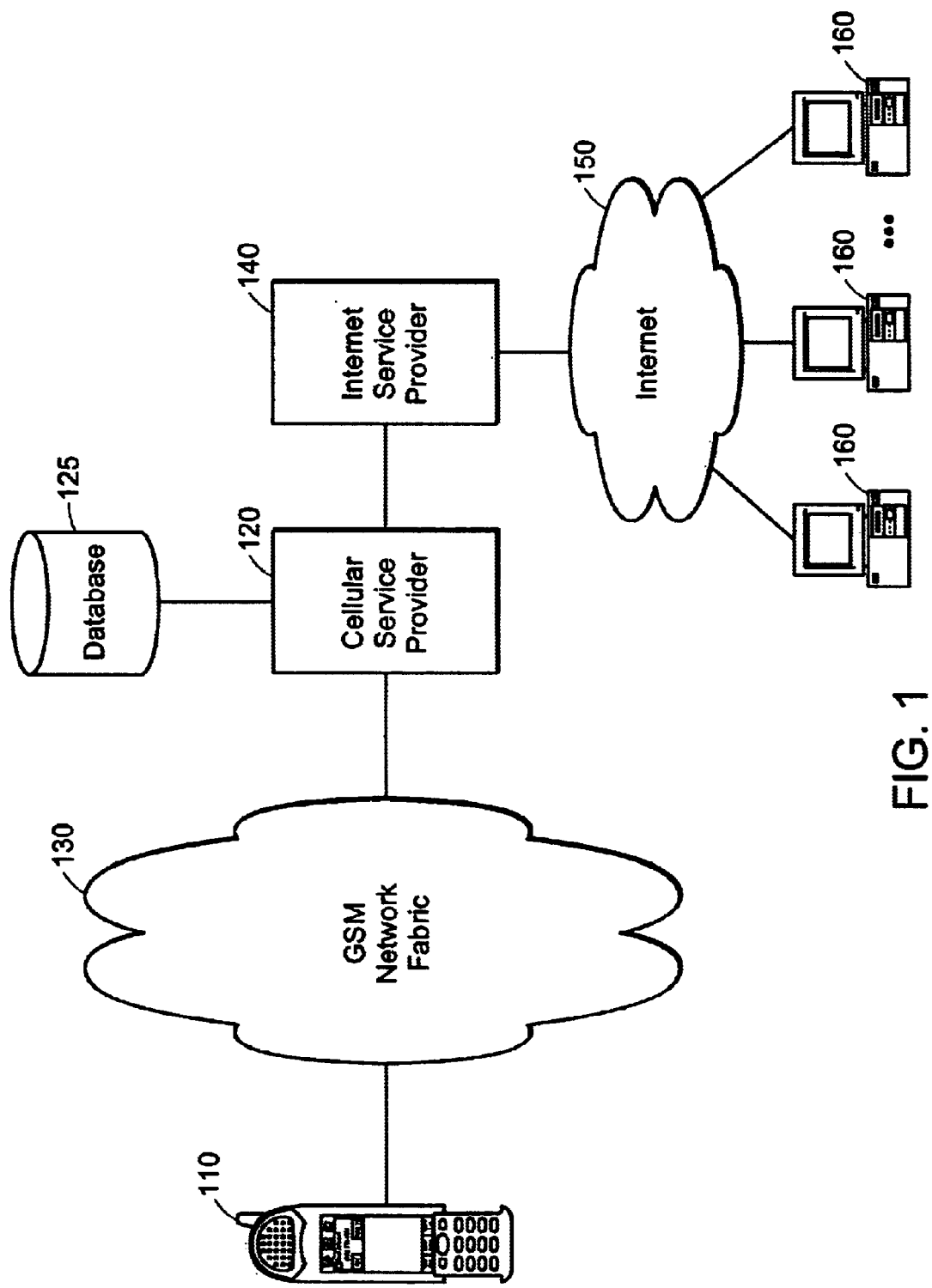
FIG. 1 is a diagram of a communication network consistent with one embodiment of the present invention.

Reference will now be made in detail to systems and methods consistent with the invention illustrated in the accompanying drawings. Where appropriate, the same reference numerals refer to the same or similar elements. The appended claims define the scope of the invention; the following description does not limit that scope.

System Architecture

FIG. 1 shows a communications network consistent with the present invention. A network 100 preferably includes a communication device 110 connected to a cellular service provider 120 over a GSM network fabric 130. Cellular service provider 120, through Internet service provider 140, accesses the Internet 150, which includes several web servers 160. Cellular service provider 120 also contains a network database 125.

The user of communication device 110 accesses information of web servers 160 through a communications network, such as GSM network fabric 130. Although FIG. 1 shows communication device 110 directly connected to GSM network fabric 130, more typically, communication device 110 connects to GSM network fabric 130 via another type of network, such as a Public Switched Telephone Network (PSTN).

Figure 2:
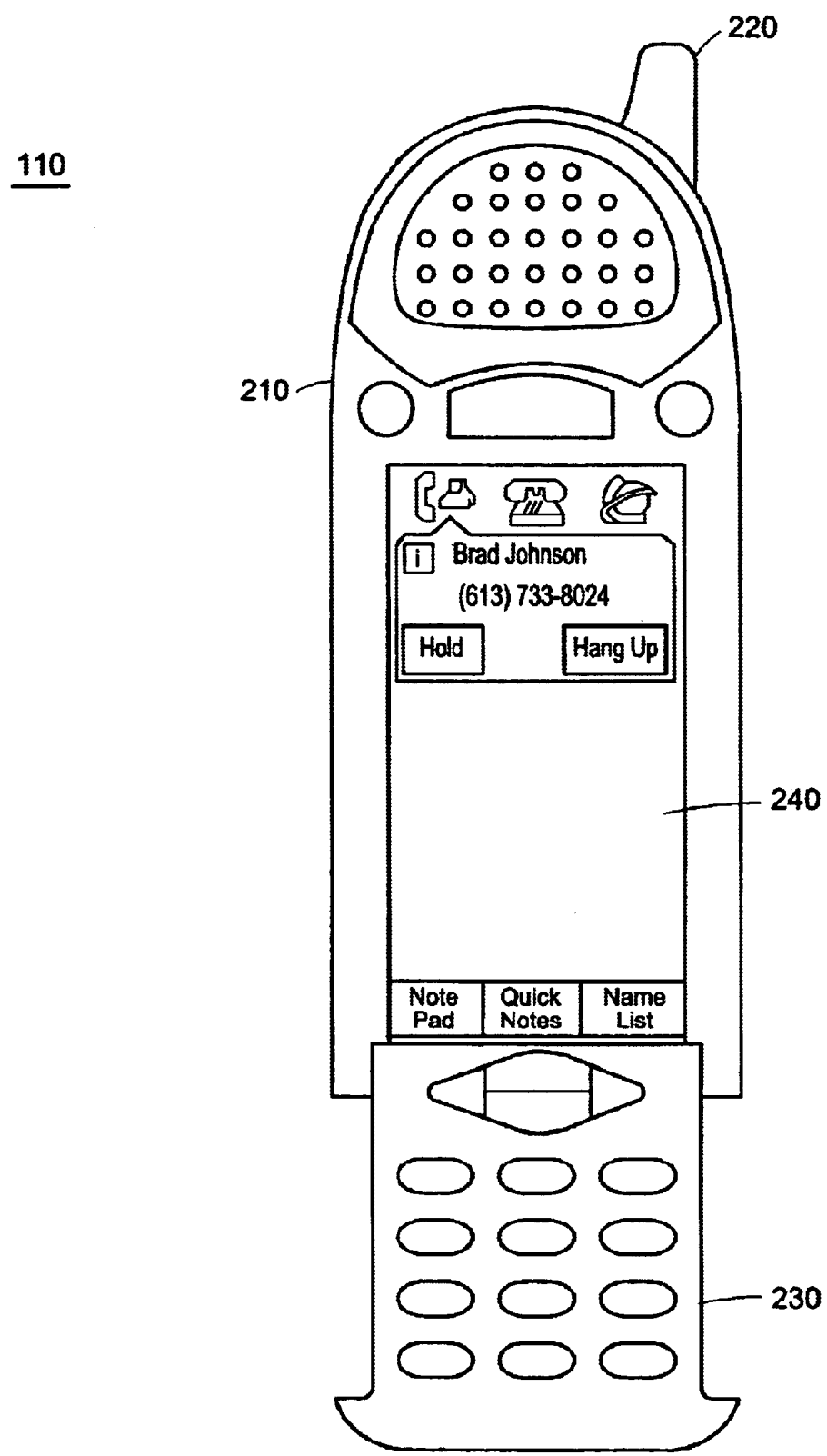
FIG. 2 is a diagram of a mobile telephone shown in FIG. 1.

Communication device 110 provides a user-friendly interface to facilitate incoming and outgoing communication by the user. FIG. 2 shows an exemplary communication device 110 as a mobile telephone having a main housing 210, an antenna 220, a keypad 230, and a display 240. For purposes of this invention, however, communication device 110 need not be a mobile telephone and can be any device capable of performing necessary communication functions including a wireline telephone, personal computer, personal digital assistant, portable computer, or cell phone.

Figure 3:
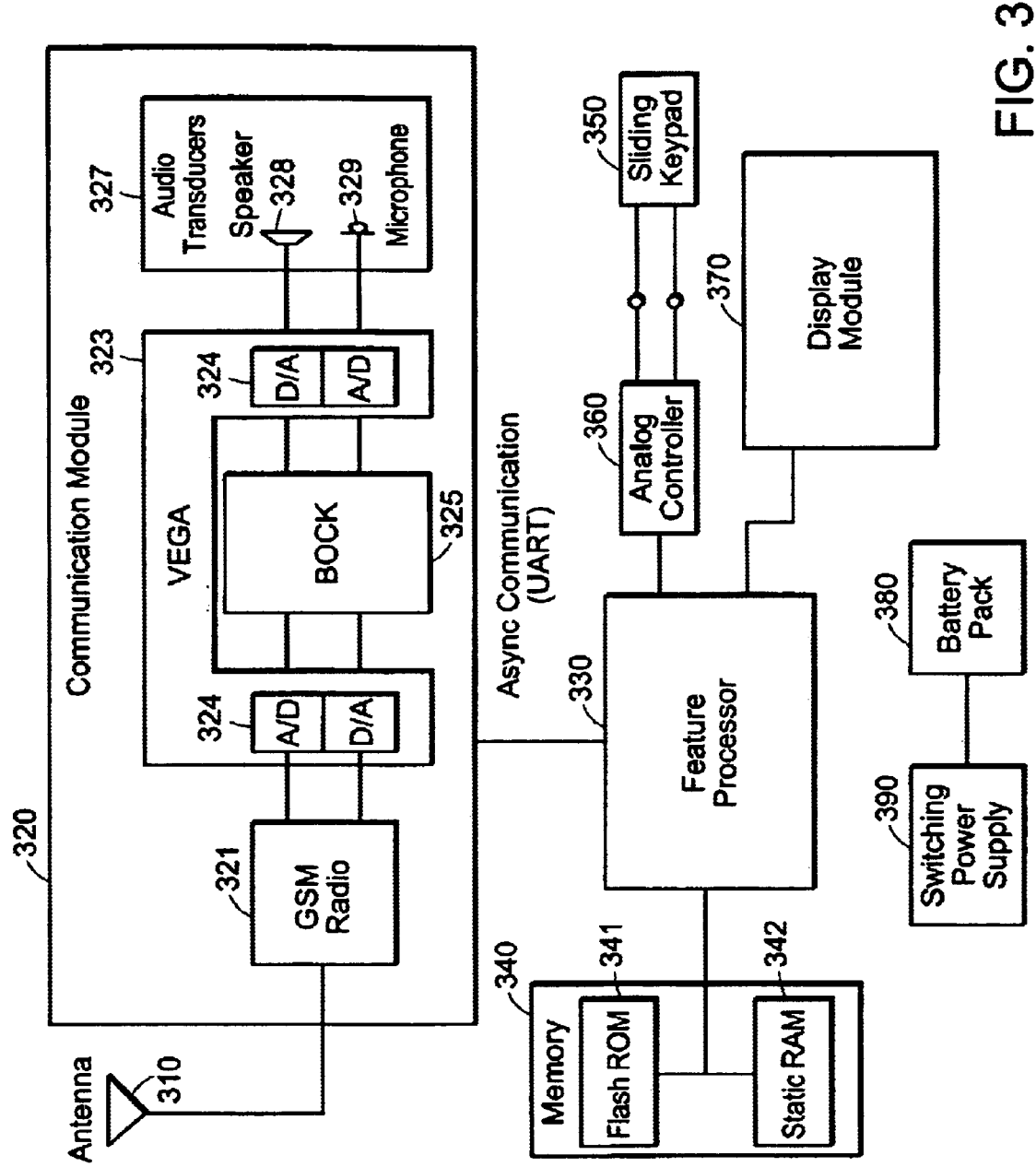
FIG. 3 is a block diagram showing the elements of the mobile telephone of FIG. 2.

FIG. 3 shows the hardware elements in communication device 110 including antenna 310, communications module 320, feature processor 330, memory 340, sliding keypad 350, analog controller 360, display module 370, battery pack 380, and switching power supply 390. Antenna 310 transmits and receives radio frequency information for communication device 110. Antenna 310 preferably comprises a planar inverted F antenna (PIFA)-type or a short stub (2 to 4 cm) custom helix antenna. Antenna 310 communicates over GSM network fabric 130 using a conventional voice B-channel, data B-channel, or GSM signaling channel connection.

Communications module 320 connects to antenna 310 and provides the GSM radio, baseband, and audio functionality for communication device 110. Communications module 320 includes GSM radio 321, VEGA 323, BOCK 325, and audio transducers 327.

GSM radio 321 converts the radio frequency information to/from the antenna into analog baseband information for presentation to VEGA 323. VEGA 323 is preferably a Texas Instruments VEGA device, containing analog-to-digital (A/D)/digital-to-analog (D/A) conversion units 324. VEGA 323 converts the analog baseband information from GSM radio 321 to digital information for presentation to BOCK 325.

BOCK 325 is preferably a Texas Instruments BOCK device containing a conventional ARM microprocessor and a conventional LEAD DSP device. BOCK 325 performs GSM baseband processing for generating digital audio signals and supporting GSM protocols. BOCK 325 supplies the digital audio signals to VEGA 323 for digital-to-analog conversion. VEGA 323 applies the analog audio signals to audio transducers 327. Audio transducers 327 include speaker 328 and microphone 329 to facilitate audio communication by the user.

Feature processor 330 provides graphical user interface features and a Java Virtual Machine (JVM). Feature processor 330 communicates with BOCK 325 using high level messaging over an asynchronous (UART) data link. Feature processor 330 contains additional system circuitry, such as a liquid crystal display (LCD) controller, timers, UART and bus interfaces, and real time clock and system clock generators (not shown).

Memory 340 stores data and program code used by feature processor 330. Memory 340 includes flash ROM 341 and static RAM 342. Static RAM 342 is a volatile memory that stores data and other information used by feature processor 330. Flash ROM 341, on the other hand, is a non-volatile memory that stores the program code executed by feature processor 330.

Sliding keypad 350 enables the user to dial a telephone number, access remote databases, and manipulate the graphical user interface features. Sliding keypad 350 preferably includes a mylar resistive key matrix that generates analog resistive voltage in response to actions by the user. Sliding keypad 350 preferably connects to main housing 210 of communication device 110 through two mechanical "push pin"-type contacts.

Analog controller 360 is preferably a Phillips UCB 1100 device that acts as an interface between feature processor 330 and sliding keypad 350. Analog controller 360 converts the analog resistive voltage from sliding keypad 350 to digital signals for presentation to feature processor 330.

Display module 370 is preferably a 160 by 320 pixel LCD with an analog touch screen overlay and an electroluminescent backlight. Display module 370 operates in conjunction with feature processor 330 to display the graphical user interface features.

Battery pack 380 is preferably a single lithium-ion battery with active protection circuitry. Switching power supply 390 ensures highly efficient use of the lithium-ion battery power by converting the voltage of the lithium-ion battery into stable voltages used by the other hardware elements of communication device 110.

Figure 4:
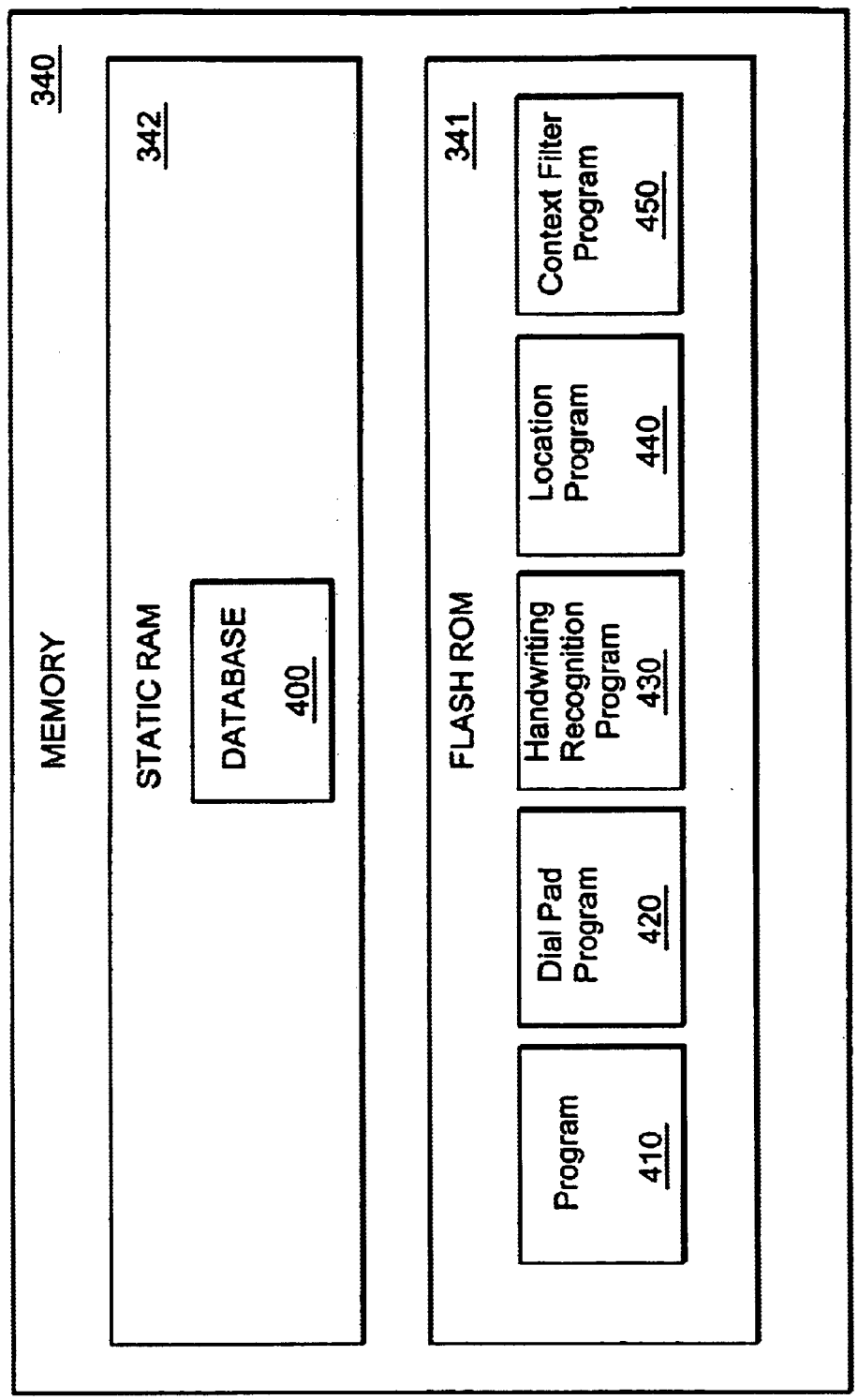
FIG. 4 is a block diagram showing the components of the memory of FIG. 3.

FIG. 4 is a block diagram illustrating the components of memory 340. Static RAM 342 contains a local database 400 storing various types of data. Flash ROM 341 contains various programs including a program 410, a dialpad program 420, a handwriting recognition program 430, a location program 440, and a context filter program 450. Program 410, preferably written in languages such as Java, C, or C++ for Macintosh, is a main program overseeing the operation of communication device 110. Dialpad program 420 facilitates data entry using keypad 230 using a typical keypad algorithm. Handwriting recognition program 430 recognizes and translates handwriting input from display 240. Location program 440 may be a commercially available map program such as one provided by web-based service MapIt. Context filter program 450 can be implemented with cookies and may reside in database 400 of communication device 110 or a server such as cellular service provider 120, network database 125, or Internet service provider 140.

For purposes of describing dynamic context filtering consistent with the present invention, Internet 150 is used as an exemplary network. The present invention, however, can be implemented in other types of local or wide area networks. Consistent with the present invention, communication device 110 is capable of connecting to web-based services, such as airline reservation services, hotel location and reservation services, and national telephone directories. As shown in FIG. 1, communication device 110 accesses web servers 160 through cellular service provider 120 and Internet service provider 140.

Figure 5:
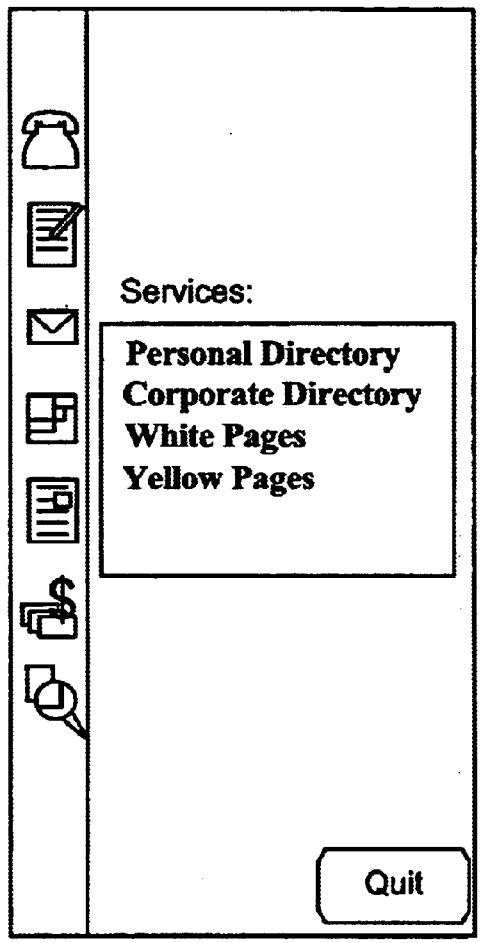
FIGS. 5–8 are sample screens for using web-based services.
Figure 6:
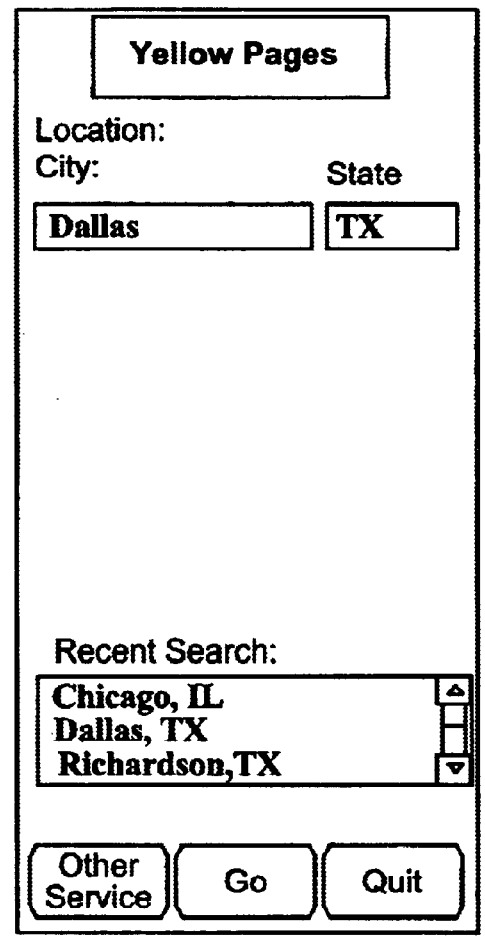
Figure 7:
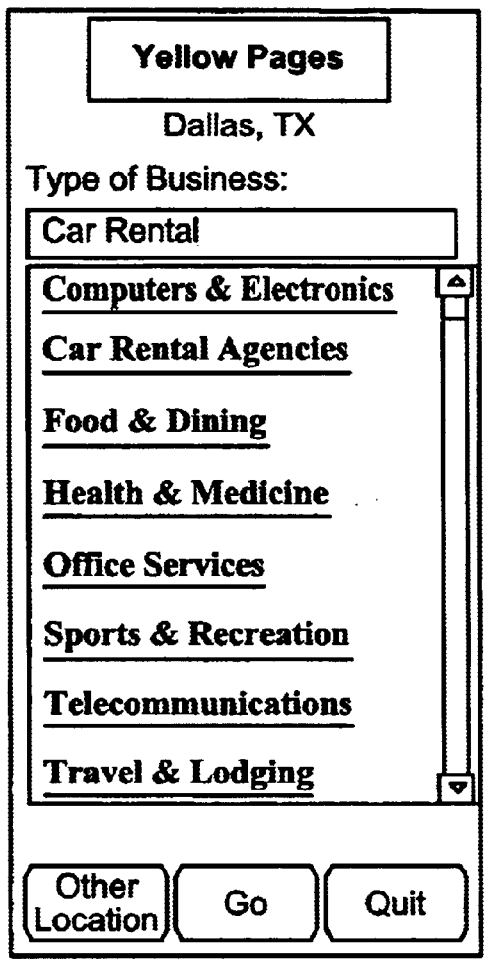
Figure 8:
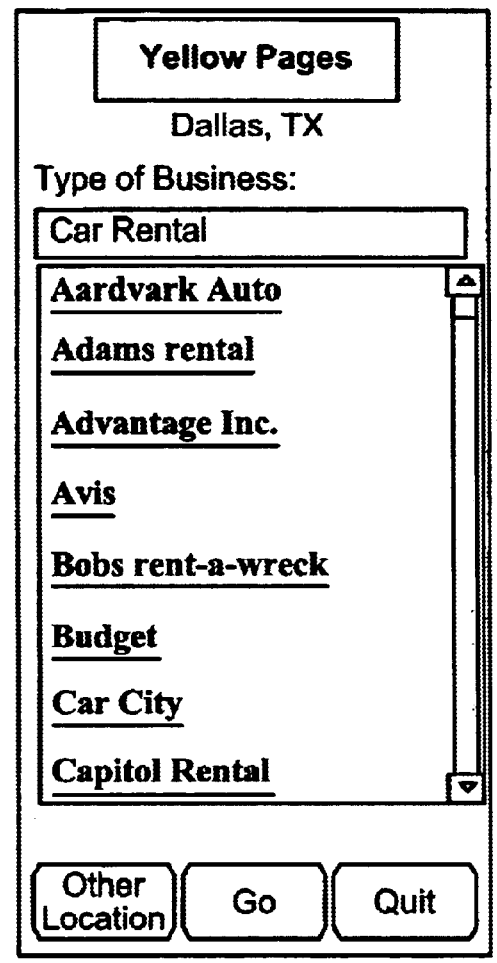

With current web-based services, a user generally must specify the user's location and the type of business to be searched. For example, for Yellow Pages services (FIG. 5), the user must manually identify the location, e.g., Dallas (FIG. 6), and specify the desired type of service, e.g., car rental agencies (FIG. 7). The service, however, returns a very long list of all car rental agencies located anywhere in or near Dallas (FIG. 8). It is thus very tedious and time-consuming to scroll through the list, particularly when communication device 110 is a mobile telephone having a small display.

Systems and methods consistent with the present invention enable dynamic context filtering of the network information. The dynamic context filtering automatically adjusts as the context, e.g., time, location and conditions, of the request changes. Thus, the results of identical search requests from users of different contexts or environments may differ. In one such system, the dynamic context filtering can be implemented as a two-tiered process: hard filtering and soft filtering. Initially, hard filtering process filters network information based on a predetermined set of criteria or dynamic parameters that change its values. For example, parameters such as city/state of the desired business, the user's location, and the time may have different values depending on the location of communication device 110 at a particular point in time.

Subsequently, a soft filter process uses a varying set of parameters and re-filters the filtered information to further reduce the amount of information to a small subset of information highly relevant to a particular user. One skilled in the art may, however, use a single-tier process, choosing only the hard filtering process or the soft filtering process alone.

In one embodiment consistent with the present invention, a soft filter can build its own model over time independent of specific instructions from the user. The soft filter, for example, may track the user's behavior based on user selections over time and build a predictive model of user preferences. In another embodiment consistent with the present invention, the user may explicitly select preferences thus creating a user-defined profile to enable program 410 to select and present the most appropriate information to the user. To do so, the present invention may provide a menu to allow the user to create a soft filter, for example, using check boxes.

In one embodiment consistent with the present invention, the user may choose to prioritize the information based on past preferences or by user profile. If the user selects to prioritize using both criteria, however, the user may assign a higher priority to one criteria over another, e.g., user profile has priority over past preferences.

Figure 9:
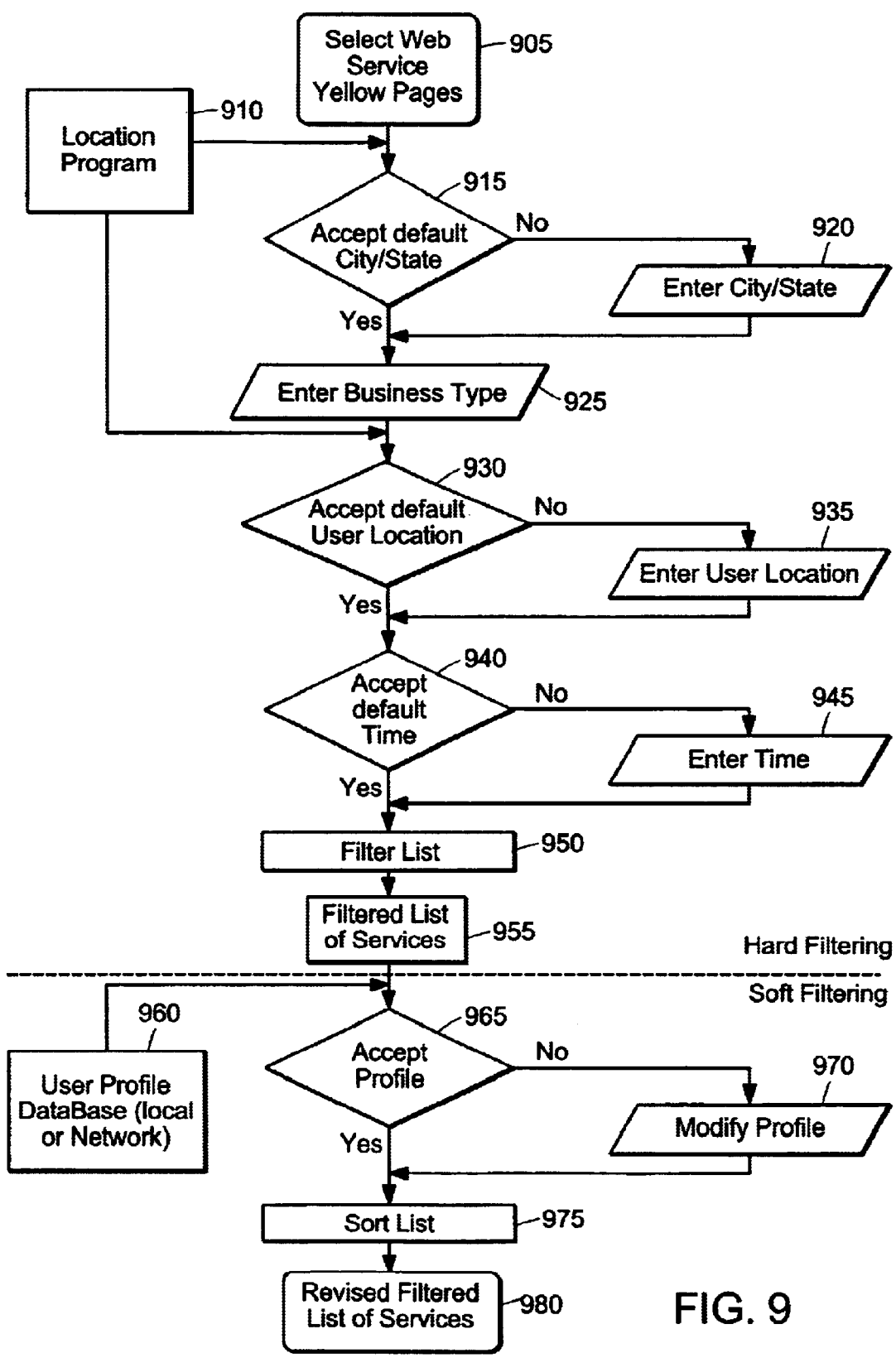
FIG. 9 is a flowchart illustrating the process of dynamically filtering information.

FIG. 9 is a flowchart illustrating dynamic context filtering consistent with the present invention. First, a user selects the desired web service, e.g., Yellow Pages (step 905). At this point, location program 440 determines the current location of communication device 110 (step 910). If communication device 110 is a mobile or cellular telephone, for example, the handset contains the current location information based on cell cites. Handsets could also implement Global Positioning System capability for more precise locator capability. On the other hand, if communication device 110 is a wireline, communication device 110 contains local calling area information or the area code. If communication device 110 is a stationary device other than a wireline, e.g., a personal computer, program 410 contains a default user location. Next, program 410 presents an option to accept a default city and state information for the desired service (step 915).

If the user elects not to accept the default city/state, the user can enter the new city/state of the desired service (step 920). The user also enters the desired business type or service for which the user would like to obtain information (step 925). The present invention facilitates many modes of data entry. For example, the user may enter the data using keypad 230, in which case dialpad program 420 interprets the input data. Alternatively, the user may input data by touching an on-screen keyboard. Also, the user may enter data by writing on display 240, which is then interpreted by handwriting recognition program 430. Voice command is another mode of data entry facilitated by state-of-the-art voice recognition technology.

Program 410 can also present an option to accept the current or default user location (step 930). Once again, if the user elects not to accept the default user location, the user can enter the new user location (step 935). The new user location can be based, for example, on the projected location that the user expects to be in.

Program 410 also presents an option to accept default time (step 940). The time can be obtained from a plurality of sources including an internal clock in communication device 110 or a network. The user can elect to modify the default time to a different time, for example, projected time of arrival (step 945). Based on the default or modified parameters city/state, user location, and time, program 410 filters the information obtained from Internet 150 (step 950). In one embodiment consistent with the present invention, location program 440 may compute the proximity of the user location to the desired businesses. Program 410 may also compare the default or modified time to the web information such as hours of operation of the desired businesses.

Program 410 may implement the filtering process in various ways. For example, program 410 may contain rule-based "intelligence" or algorithm that searches the content for data corresponding to the parameters of the context filter, such as time and location, for filtering purposes. Alternatively, content information at web servers 160 may be organized according to a convention adopted to facilitate filtering, e.g., having predetermined time and location fields in the content information. For example, cellular service providers or other service providers may structure their databases and content information by having specific fields of extractable information. In the yellow pages scenario, the context filer may search for information in structured fields such as name, street address, city, and hours of operation.

Figure 10:
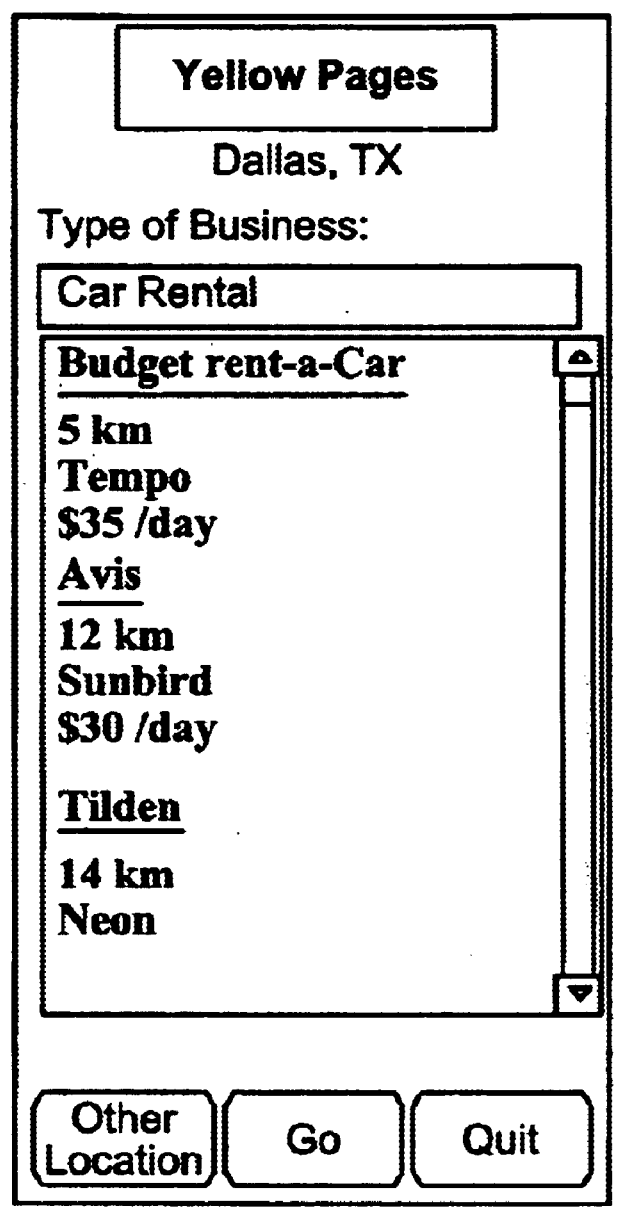
FIG. 10 is a sample screen of displaying filtered information.

Once the initial set of information has been filtered and reduced to a short list of highly-relevant services (step 955), program 410 can display the filtered list to the user as shown in FIG. 10. In one embodiment consistent with the present invention, program 410 prioritizes the list presented to the user based on the proximity to the user location. Also, program 410 prioritizes the filtered list based on businesses that are currently open by comparing the default or modified time against the business hours of operation. Other parameters of the dynamic context filter, such as past preferences, may be used to prioritize the filtered list. Additionally, program 410 may accord varying weights to the parameters according to its importance to the user. A user may choose, for example, to accord greater weight to a business location over the time parameter in prioritizing the list.

In addition to the hard filtering process described above, program 410 can further filter the information using the soft filtering process. To do so, context filter program 450 maintains dynamic context filter containing, for example, a user's profile and the user's past selections of individual services. As shown in FIG. 11, an example of past preferences of a user for services may track parameters such as business name, location indicating proximity to user location, cost (e.g., average cost compared to amount spent on similar transactions in the past compared to listed costs for rental, entree for restaurant, person/night for hotels), frequency of access (i.e., number of times a particular service has been used or queried relative to other businesses), certification (e.g., Association approval such as AAA or UL, number of stars restaurant rating), acceptable method of payment (e.g., cash only, Visa, Mastercard, checks, electronic debit), as well as other miscellaneous fields (e.g., accessibility from main avenues, seat and aisle, hours of business, smoking, vegetarian, and adjunct service such as TV, A/C, entertainment).

The format and content of the dynamic context filter may vary widely. For example, there may be separate highly customized filters based on the type of service or a more generic context filter may be used for many services. In one embodiment of the present invention, context filter program 450 may include an adaptive software interface located on a server that is continuously updated and whose value as an effective personalized soft filter grows over time with frequency of use. Alternatively, the user may initialize the dynamic context filter through a general profile configuration through web-based forms accessible from a variety of devices such as automated telephone service, computer internet access, or a series of reply SMS (Short Messaging Services) messages sent to a phone having a display. The user may also initialize the dynamic context filter at the time of purchase when it is offered as a special interest group profile or as a service offered by an Internet service provider or cellular company for preferred discounts to its customers.

Thus, if the user elects to soft filter the filtered information using the user profile portion of the dynamic context filter (step 960), the user has an option to accept the default user profile (step 965). If the user elects to modify the profile, the user can modify one or more of user profile parameters (step 970). Subsequently, context filter program 450 re-filters the information (step 975), and produces a revised filtered set of network information (step 980). The user may then select one of the listed services through a number of standard selection mechanisms, such as a pull-down menu, highlighting, or clicking on the desired entry. Context filter program 450 may be designed to allow a user to repeatedly re-filter the information, each time modifying one or more parameters of the dynamic context filter until the user is satisfied with level of specificity and the volume of the filtered information.

It will be apparent to those skilled in the art that various modifications and variations can be made in systems and methods consistent with the present invention and in construction of this system without departing from the scope or spirit of the invention. Other embodiments will be apparent to those skilled in the art from consideration of the specification and practice of the invention disclosed herein. The specification and examples should be considered as exemplary only, with the true scope and spirit of the invention indicated by the following claims.

What is claimed is:

1. A method, performed by a server connected to a mobile communication device, of dynamically filtering information using a dynamic context filter, comprising:
creating a profile containing parameters used by a dynamic context filter in the server, wherein the profile is associated with a user;
receiving from the mobile communication device a request for information from a network;
determining a location of the mobile communication device;
determining a context for the request based on the location and the profile;
providing the dynamic context filter information indicating requests made by the user before the request was received;
providing the dynamic context filter the request and the context for the request; and
dynamically filtering the information from the network based on the request, the information indicating requests made by the user before the request was received, and the context using the dynamic context filter.

2. The method of claim 1, further including transmitting the filtered information to the communication device.

3. The method of claim 1, further including re-filtering the filtered information using the dynamic context filter.

4. The method of claim 1, further including modifying values of the parameters for the dynamic context filter based on past preferences.

5. The method of claim 1, further including modifying values of the parameters for the dynamic context filter based on past preferences.

6. The method of claim 1, further including weighting one of the parameters for the dynamic context filter.

7. The method of claim 1, further including prioritizing the filtered information according to a predetermined criteria.

8. The method of claim 7, wherein the predetermined criteria includes a parameter selected from a group consisting of user location, time, and past preferences.

9. A method, performed by a mobile communication device connected to a server, of providing dynamically filtered information using a dynamic context filter, comprising:
receiving at the mobile communication device a request for information from a network;
transmitting to the server the request for information from the network;
transmitting to the server at least one parameter regarding a profile associated with the mobile communications device;
transmitting to the server information regarding the location of the mobile communication device;
receiving from the server information from the network, wherein the information from the network is dynamically filtered using the dynamic context filter based on the request, and a context for the request that is determined based on information indicating requests made by the user before the request was received, the location of the mobile communication device, and the profile.

10. A method, performed by a mobile communication device connected to a server, of dynamically filtering information using a dynamic context filter, comprising:
creating a profile containing parameters used by a dynamic context filter in the server, wherein the profile is associated with a user;
receiving from a user a request for information from a network;
transmitting to the server the request for information from the network;
receiving from the server the requested information;
determining a location of the mobile communication device;
determining a context for the request based on information indicating requests made by the user before the request was received, the location, and the profile;
providing the dynamic context filter the context for the request; and
dynamically filtering the information based on the context for the request using the dynamic context filter.

11. The method of claim 10, further including re-filtering the filtered information using the dynamic context filter.

12. A server, connected to a mobile communication device, for dynamically filtering information using a dynamic context filter, comprising:

means for creating a profile containing parameters used by a dynamic context filter in the server, wherein the profile is associated with a user;

means for receiving from the mobile communication device a request for information from network;

means for determining a location of the mobile communication device;

means for determining a context for the request based on the location and the profile;

means for providing the dynamic context filter the request and the context for the request; and means for dynamically filtering the information from the network based on the request, information indicating requests made by the user before the request was received, and the context using the dynamic context filter.

13. The server of claim 12, further including means for transmitting the filtered information to the communication device.

14. The server of claim 12, further including means for re-filtering the filtered information using the dynamic context filter.

15. The server of claim 12, further including means for predefining values for the parameters of the dynamic context filter before receiving the request for information.

16. The server of claim 12, further including means for modifying values for the parameters of the dynamic context filter based on past preferences.

17. The server of claim 12, further including means for weighting one of the parameters for the dynamic context filter.

18. The server of claim 12, further including means for prioritizing the filtered information according to a predetermined criteria.

19. The server of claim 18, wherein the predetermined criteria includes a parameter selected from a group consisting of user location, time, and past preferences.

20. A mobile communication device, connected to a server, for providing dynamically filtered information using a dynamic context filter, comprising:

means for receiving at the mobile communication device a request for information from a network;

means for transmitting to the server the request for information from the network;

means for transmitting to the server at least one parameter regarding a profile associated with the mobile communications device;

means for transmitting to the server information regarding the location of the mobile communication device; and means for receiving from the server information from the network, wherein the information from the network is dynamically filtered using the dynamic context filter based on the request, and a context for the request that is determined based on information indicating previous requests by the user, the location of the mobile communication device, and the profile.

21. A mobile communication device, connected to a server, for dynamically filtering information using a dynamic context filter, comprising:

means for creating a profile containing parameters used by a dynamic context filter in the server, wherein the profile is associated with a user;

means for receiving from a user a request for information from a network;

means for transmitting to the server the request for information from the network;

means for receiving from the server the requested information;

means for determining a location of the mobile communication device;

means for determining a context for the request based on information indicating requests made by the user before the request was received, the location, and the profile;

means for providing the dynamic context filter the context for the request, and means for dynamically filtering the information based on the context for the request using the dynamic context filter.

22. The method of claim 21, further including means for re-filtering the filtered information using the dynamic context filter.

23. An article of manufacture capable of configuring a server to dynamically filter information using a dynamic context filter, the article comprising program code to cause the server to perform the steps of:

creating a profile containing parameters used by the dynamic context filter in the server, wherein the profile is associated with a user;

receiving from a mobile communication device a request for information from the network;

determining the location of the mobile communication device;

determining a context for the request based on information indicating requests made by the user before the request was received, the location, and the profile;

providing the dynamic context filter the context for the request; and dynamically filtering the information from the network based on the request and the context using the dynamic context filter.

24. An article of manufacture capable of configuring a data processor to dynamically filter information using a dynamic context filter, the article comprising program code to cause the data processor to perform the steps of:

creating a profile containing parameters used by the dynamic context filter in the server, wherein the profile is associated with a user;

receiving from a user a request for information from the network;

transmitting to the server the request for information from the network receiving from the server the requested information;

determining a location of a mobile communication device;

determining a context for the request based on information indicating requests made by the user before the request was received, the location and the profile;

providing the dynamic context filter the context for the request; and dynamically filtering the information from the network based on the context using the dynamic context filter.

\* \* \* \* \*